United States Patent [19]

Frenyo

[11] Patent Number: 4,664,448
[45] Date of Patent: May 12, 1987

[54] SHEAR-TYPE LOADER FOR A TUNNEL AND GALLERY EXCAVATOR

[75] Inventor: Paul Frenyo, Bochum, Fed. Rep. of Germany

[73] Assignee: Paurat GmbH, Voerte, Fed. Rep. of Germany

[21] Appl. No.: 820,435

[22] Filed: Jan. 17, 1986

[30] Foreign Application Priority Data

Jan. 26, 1985 [DE] Fed. Rep. of Germany ....... 3502672

[51] Int. Cl.[4] .......................................... E21C 35/20
[52] U.S. Cl. ...................................... 299/67; 299/64; 198/514
[58] Field of Search .................... 299/64, 67; 198/514, 198/515, 516

[56] References Cited

U.S. PATENT DOCUMENTS

| 1,945,340 | 1/1934 | Arentzen | 198/514 |
| 2,099,981 | 11/1937 | Joy | 198/514 |
| 2,880,842 | 4/1959 | Abraham | 198/514 |
| 3,277,993 | 10/1966 | Arndt | 198/514 |
| 3,614,162 | 10/1971 | Teeter | 299/67 |
| 4,047,762 | 9/1977 | Bamford et al. | 198/514 X |

Primary Examiner—Stephen J. Novosad
Assistant Examiner—Michael A. Goodwin
Attorney, Agent, or Firm—Karl F. Ross; Herbert Dubno

[57] ABSTRACT

A loading mechanism operating on a loading apron of a tunnel and gallery excavator or the like comprises an eccentric-carrying crank disk, a crank lever, a shear rake, and a link. The eccentric-carrying crank disk is rotatable about its axis in a single direction of rotation, and the crank lever is connected to an eccentric pivot on the eccentric-carrying crank disk. The crank lever is pivotally connected by a lever arm to the link, which is attached pivotally to the apron behind the eccentric-carrying crank disk with respect to the forward direction of travel of the tunnel and gallery excavator. The shear rake is constructed as a bent lever with a raking arm and a controlling arm and at the vertex of the angle formed between the raking arm and the shear rake is mounted on the eccentric pivot with a vertex joint. A first end of an operating lever is connected to the controlling arm by a first operating lever pivot joint, and a second end of the operating lever is connected in the vicinity of the middle of the link by a second operating lever pivot joint. An improved tunnel and gallery excavator using two of the improved loading mechanisms is also described.

8 Claims, 4 Drawing Figures

4,664,448

SHEAR-TYPE LOADER FOR A TUNNEL AND GALLERY EXCAVATOR

FIELD OF THE INVENTION

My present invention relates to a shear-type loader for the loading apron of an excavator, and, more particularly, to a mechanism for raking material excavated by a tunnel and gallery excavator on a loading apron onto a conveyer carrying the detritus away from the excavating face.

BACKGROUND OF THE INVENTION

A shear-type mechanism can be provided on a loading apron of a tunnel and gallery excavator for displacing excavated detritus as it is deposited on the apron, onto a conveyer carrying the detritus rearwardly as the excavator is advanced. This mechanism can comprise a crank disk, a crank lever, a shearing rake or scraper, and a guide member or pivoted link.

The disk is rotatably driven about its axis of rotation on the loading apron in a single direction of rotation and the crank lever is connected to a pivot mount or pin on the mounting disk.

The crank lever is pivotally connected by a lever arm to the guide member or link, which is pivotally attached behind the eccentric carrying crank disk on the loading apron with regard to the forward travel direction of the tunnel and gallery excavator. The rake is connected to the crank lever.

These parts form a lever mechanism having pivot joints, and are so constructed with respect to the lever arm of the crank lever that the load occuring is taken up reliably and properly acted upon. The load is often increased when large broken stones are involved. The device on which the loading mechanism is mounted may be any tunneling machine such as a gallery excavator or shaft excavator.

Heretofore the shear rake has generally been a rigid extension of the connecting member projecting with the eccentric pivot over the attachment point of the connecting member. The lever mechanism is substantially all in a plane with the double-ever connected to the eccentric carrying crank disk, and is kinematically defined by the length of the lever arm, the eccentric pivot radius, and the mounting point of the guide member on the loading apron.

An analysis of the kinematic cooperation shows that the shearing rake engages very far to the front in the travel direction of the tunnel and gallery excavator, but that it sweeps over a comparatively small region transverse to the travel direction of the tunnel and gallery excavator. An undesirable ratio of the width of the loading mechanism to the total depth of the loading mechanism in the forward travel direction exists in the loading mechanism of the prior art.

On the other hand, practice requires a loading mechanism which is comparatively wide, in order to be able to extend the range of action of an excavator which is, for example, mounted on tracks. That is hardly possible with prior art mechanisms, since the length of the cutting or digging tool must increase in the forward direction of travel of the excavator in the same proportion.

The cutting mechanism must be mounted with its cutting head over the forward edge of the loading apron at the front, drive edge of the excavator. Furthermore, widening of the apron and detritus pickup range is desirable even where undercuts below the apron are desirable.

One prior art cutting tool projects so far that the center of gravity of the tunnel and gallery excavator changes, and a counterweight is required on the end of the machine opposite the cutting tool which is expensive and impairs the versatility of the tunnel and gallery digging machine.

OBJECTS OF THE INVENTION

It is an object of my invention to provide an improved loading mechanism for a tunnel and gallery excavator whereby drawbacks of earlier systems are avoided. It is also an object of my invention to provide an improved loading mechanism for a tunnel and gallery excavator, which is constructed so that the shear rake sweeps over a wider region transverse to the forward travel direction of the tunnel and gallery excavator than in the loading mechanisms of the prior art, and of course even with a reduction of the working range of the loading mechanism in the forward travel direction of the excavator.

It is yet another object of my invention to provide an improved loading mechanism for a tunnel and gallery excavator or the like, which has improved versatility and which does not require a loading mechanism that projects excessively far forward in the travel direction of the excavator.

SUMMARY OF THE INVENTION

These objects and others, which will become more readily apparent hereinafter, are attained in a loading mechanism mounted on a loading apron of a tunnel and gallery excavator, or the like, comprising an eccentric-carrying crank disk, a crank lever, and a link. The eccentric-carrying crank disk on the loading apron is rotatable about its axis in a single direction of rotation, and the crank lever is connected to an eccentric pivot of the eccentric-carrying crank disk. The crank lever is pivotally connected by a lever arm to the link, which is attached pivotally on the apron behind the eccentric-carrying crank disks with regard to the forward direction of travel of the tunnel and gallery excavator. A shear rank is connected with the crank lever.

According to my invention the shear rake or sweeper is constructed as a bent lever with a raking arm and a controlling arm, and at the vertex of the angle formed between the raking arm and the controlling arm the shear rake is mounted on the eccentric pivot with a vertex joint, and a first end of an operating lever is connected to the controlling arm by a first operating lever pivot joint, and a second end of the operating lever is connected in the vicinity of the middle of the link by a second operating lever pivot joint.

In the loading mechanism according to my invention the shear rake is no longer an extension of the crank lever and is connected with the crank lever indirectly by the eccentric pivot or pin.

According to my invention, the double-lever mechanism connected to the eccentric-carrying crank disk of the prior art is replaced by a quadruple lever mechanism in the way described, while retaining the guide member and the crank lever. The kinematic cooperation of these components leads to an extended reach for the shear rake transverse to the travel direction of the tunnel and gallery excavator, and reduces the working zone of the loading mechanism in the forward direction of travel of the excavator. In this way, a ratio of loading width to the structural length can be attained, which is 2.8/1 or greater.

A preferred embodiment of my invention, which in regard to loading functions most reliably, comprising a raking arm which has a length, which is substantially three times the length of the controlling arm, and the length of the crank lever, the length of the guide member, and the effective length of the operating lever (i.e., the distance between pivots) respectively lies between the eccentric pivot swing radius, and twice the eccentric pivot swing radius. The eccentric pivot swing radius is defined as the distance between the center of the eccentric-carrying crank disk and the eccentric pivot. It is also advantageous in that the tip of the raking arm projects radially beyond the eccentric pivot radius R transverse to the direction of travel of the tunnel and gallery excavator by substantially twice the eccentric pivot radius (2R) and in the direction of travel of the tunnel and gallery excavator by substantially the eccentric pivot radius (R).

To provide an improved tunnel and gallery excavator or the like, two loading mechanisms of my invention are usually provided on the loading apron where they are spaced apart transversely to the direction of the excavator and on opposite sides of a conveyer, which is integrated with the loading apron and the tunnel and gallery excavator.

The two loading mechanisms are driven synchronously, but out-of-phase, and the raking arms of these mechanisms sweep over a common area on the conveyer. The sweep patterns define a figure-eight. That leads to a reliable feed of the excavated material to the conveyer. The out-of-phase relationship allows a continuous input of material without collision between the raking arms in the vicinity of the conveyer. Both loading mechanisms can have a common drive.

BRIEF DESCRIPTION OF THE DRAWING

The above and other objects, features, and advantages of my invention will become more readily apparent from the following description, reference being made to the accompanying highly diagrammatic drawing in which.

SPECIFIC DESCRIPTION

Figure 1:
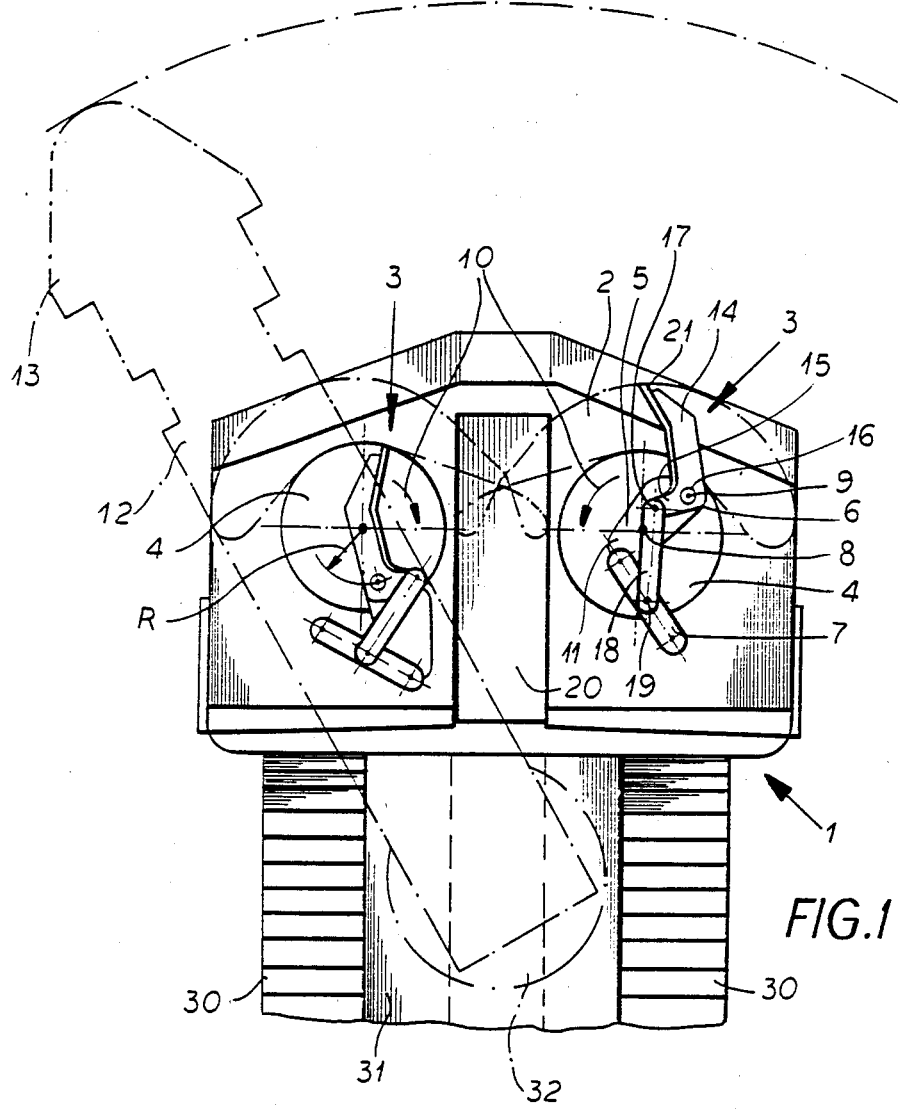
FIG. 1 is a top view of a portion of a tunnel and gallery excavator having a loading mechanism according to the invention.

The tunnel and gallery excavator 1 shown in FIG. 1 has a pair of tracks 30 supporting a chassis 31 on which is mounted a turret 32 carrying the excavating arm 12 with its head 13, such excavators can be of the type described in Ser. No. 692,039 filed Jan. 16, 1985 coassigned with the present application and the patents and application there cited. The chassis has at its forward end a loading apron 2 and two loading mechanisms 3 operating on the loading apron 2.

Each loading mechanism 3 comprises an eccentric-carrying crank disk 4, a crank lever 5, a shear rake 6, and a link 7.

The eccentric-carrying crank disk 4 is rotatably mounted on the loading apron 2, so as to be rotatable about its axis of rotation 8 in a single direction of rotation, and the crank lever 5 is connected to an eccentric pivot or pin 9 of the eccentric-carrying crank disk 4. The direction of rotation is provided to the eccentric-carrying crank disk 4 as the curved arrow 10 indicates. The crank lever 5 is pivotally connected by a lever arm 11 to the link 7, which is pivotally attached to the loading apron 2 behind the eccentric-carrying crank disk 4 in the travel direction of the tunnel and gallery excavator 1.

Figure 4:
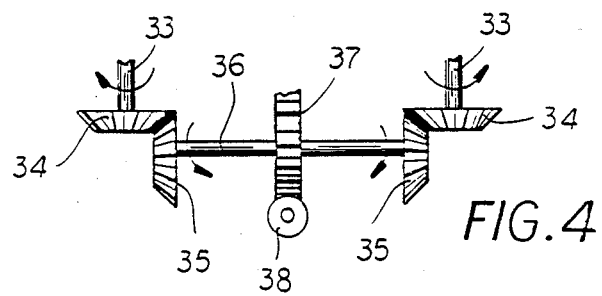
FIG. 4 is an elevational view of a common drive for the two lever mechanisms of the loading device.

Each of the disks 4 can be coupled to a respective shaft 33 (FIG. 4) bearing a bevel gear 34 meshing with a bevel gear 35 on a shaft 36 common to both mechanisms. The shaft 36 carries a worm wheel 37 driven by a worm 38 from a hydraulic motor (not shown) and forming the common drive for both mechanisms to synchronize the rotation thereof in phase-shifted relation as is visible in FIG. 1.

In the drawing, one sees primarily the loading apron 2 of the tunnel and gallery excavator 1. A pivotable cutting or digging tool 13 mounted on a digging arm 12 is only indicated in dot-dash lines. Moreover, in FIGS. 2 and 3 only half of the loading apron 2 is shown, however the left half of the loading apron 2 is formed substantially identical to the right half in the embodiment shown in the drawing.

The pivot 7a connects the link or guide member 7 to the apron 2 at one end of the link directly behind the respective disk 4. A pivot 7b at the opposite end of the link 7 connects it to the lever 11.

The shear rake 6 is constructed as a bent (angle) lever with a raking arm 14 and a controlling arm 15, and at the vertex of the angle formed between the raking arm 14 and the controlling arm 15 the shear rake 6 is mounted on the eccentric pivot 9 with a vertex joint 16 and is connected with the connecting member 5 indirectly. On the controlling arm 15 an operating lever 18 is connected at its first end by an operating arm pivot joint 17, and with its other second end is pivotally attached to a second operating arm pivot joint 19 in the vicinity of the middle of the link 7. The raking arm 14 of the shear rake 6 has a length, which is approximately three times the length of the controlling arm 15.

The length of each member of the assembly of the crank lever 5, the link 7, and the operating lever 18 respectively is greater than the length of the eccentric pivot radius R by about twice the eccentric pivot radius (2R). From FIGS. 1 and 2 it can be seen that the tip 21 of the raking arm 14 projects beyond the eccentric pivot radius R along a radius of the crank disk 4 transverse to the forward travel direction by about the length of the eccentric pivot radii (2 R) and in the forward travel direction of the excavator by about the length of one eccentric pivot radius (R).

Figure 2:
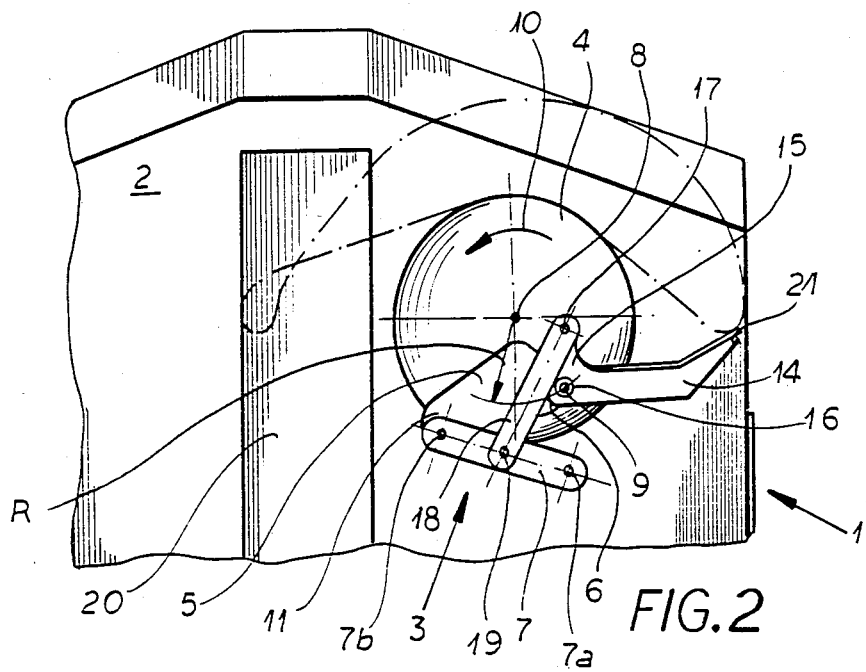
FIG. 2 is a top view through a portion of the loading mechanism according to FIG. 1 shown in a different operating position and drawn to an enlarged scale.
Figure 3:
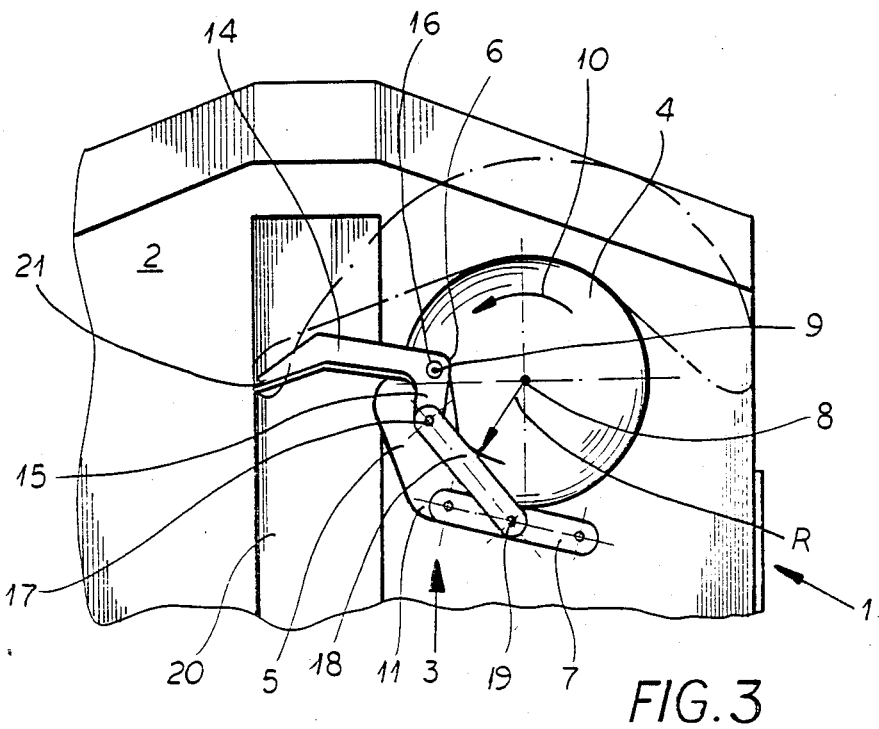
FIG. 3 is a view similar to FIG. 2, but with the parts in yet another operating position.

From a comparison of FIGS. 1 to 3 one can see the kinematic cooperation of the components connected to the eccentric-carrying crank disk 4. The limits of the scooping region can be shown with dot-dash lines which show the limits of the extreme reach of the shear rake 6. From the position in FIG. 3 the shear rake 6 moves without a work load, in continuation of the rotation of the eccentric-carrying crank disk 4 in a single previously chosen direction into the position shown in FIG. 2, further around into the position of FIG. 1, from which it again reaches the position of FIG. 3.

The tunnel and gallery excavator 1 has a conveyer 20 as shown in FIG. 1. One also must understand that the unshown half of the loading apron 2 according to FIGS. 2 and 3 has a loading mechanism 3 of the same structure as described above, so that the conveyer 20 is positioned between both these loading mechanisms 3. In this case the loading mechanisms are driven synchronously, but out-of phase, wherein the raking arm 14 sweeps over a common area on the conveyer 20.

At the point of reversal, the end point at the conveyer side has a particular kinematic pattern. Here the tip 21 of the raking arm 14 described a loop as shown in dot-dash lines in FIGS. 2 and 3 and releases, as a result of this loop, during its motion, the material removed from apron 2 onto the conveyer 20.

I claim:

1. In a loading mechanism operating on a loading apron of a tunnel and gallery excavator said loading mechanism comprising an eccentric-carrying crank disk rotatable about an axis, a crank lever, a shear rake, and a link, wherein said eccentric-carrying crank disk on said loading apron is rotatable about the axis thereof in a single direction of rotation and said crank lever is connected to an eccentric pivot of said eccentric-carrying crank disk, wherein said crank lever is pivotally connected by a lever arm unitary therewith to said link, said link being pivotally attached to said loading apron behind said eccentric-carrying crank disk with respect to the forward direction of travel of said tunnel and gallery excavator, and wherein further said shear rake is connected with said crank lever, the improvement wherein said shear rake is constructed as a bent lever with an angle between a raking arm formed thereon and a controlling arm formed thereon and at the vertex of the angle formed between said raking arm and said controlling arm said shear rake is mounted on said eccentric pivot with a vertex joint, and a first end of an operating lever is connected to said controlling arm by a first operating lever pivot joint and a second end of said operating lever is connected in the vicinity of the middle of said link by a second operating lever pivot joint.

2. The improvement defined in claim 1 wherein said raking arm of said shear rake has a length which is substantially three times the length of said controlling arm, and the lengths of said crank lever, said link, and said operating lever are each between the length of the eccentric pivot radius and twice said eccentric pivot radius.

3. The improvement defined in claim 2 wherein a tip of said rotating arm projects radially beyond said eccentric pivot radius transverse to said direction of travel of said tunnel and gallery excavator by a distance substantially equal to twice said eccentic pivot radius and in said direction of travel of said tunnel and gallery excavator by a distance substantially equal to said eccentric pivot radius.

4. The improvement defined in claim 1 wherein two of said loading mechanisms are mounted on said loading apron next to each other transverse to the forward direction of travel of said tunnel and gallery excavator and between said loading mechanisms a conveyer is positioned, said loading mechanisms being driven synchronously out-of-phase and said raking arms sweep over a common area on said conveyer.

5. The improvement defined in claim 4 wherein said loading mechanisms have a common drive.

6. A tunnel excavator comprising:
a tracked chassis;
an excavating arm mounted on said chassis for excavating detritus from a gallery wall;
a loading apron at a leading end of said chassis for collecting said detritus;
a conveyer on said apron for carrying said detritus rearwardly of a direction of advance of said excavating; and
respective sweep mechanisms on opposite sides of said conveyer for displacing said detritus on said apron onto said conveyer, each of said mechanisms including;
a disk rotatable on said apron and provided with an eccentric pivot,
an angularly bent sweeper having a rake arm angularly adjoining a control arm at a bend having a vertex, said sweeper being mounted swingably on said pivot,
a crank lever pivotally connected to said disk at said pivot,
a link pivotally connected at one end to said crank lever and at an opposite end to said apron behind said disk with respect to said direction, and
an operating lever pivotally connected to said link at a location intermediate the ends of said link and to said control arm to cause said rake arm to swing generally in a figure-eight pattern in sweeping detritus onto said conveyer.

7. The tunnel excavator defined in claim 6, further comprising a common drive for both of said mechanisms.

8. The tunnel excavator defined in claim 7 wherein said rake arm has a length substantially three times the length of said control arm, said pivot lies at an eccentric radius from an axis of rotation of the disk, and said levers and said link have lengths between said radius and twice said radius.

* * * * *